No. 756,041. PATENTED MAR. 29, 1904.
H. M., L. A. & J. A. MUELLER.
WINDROWER.
APPLICATION FILED JUNE 23, 1903.
NO MODEL.
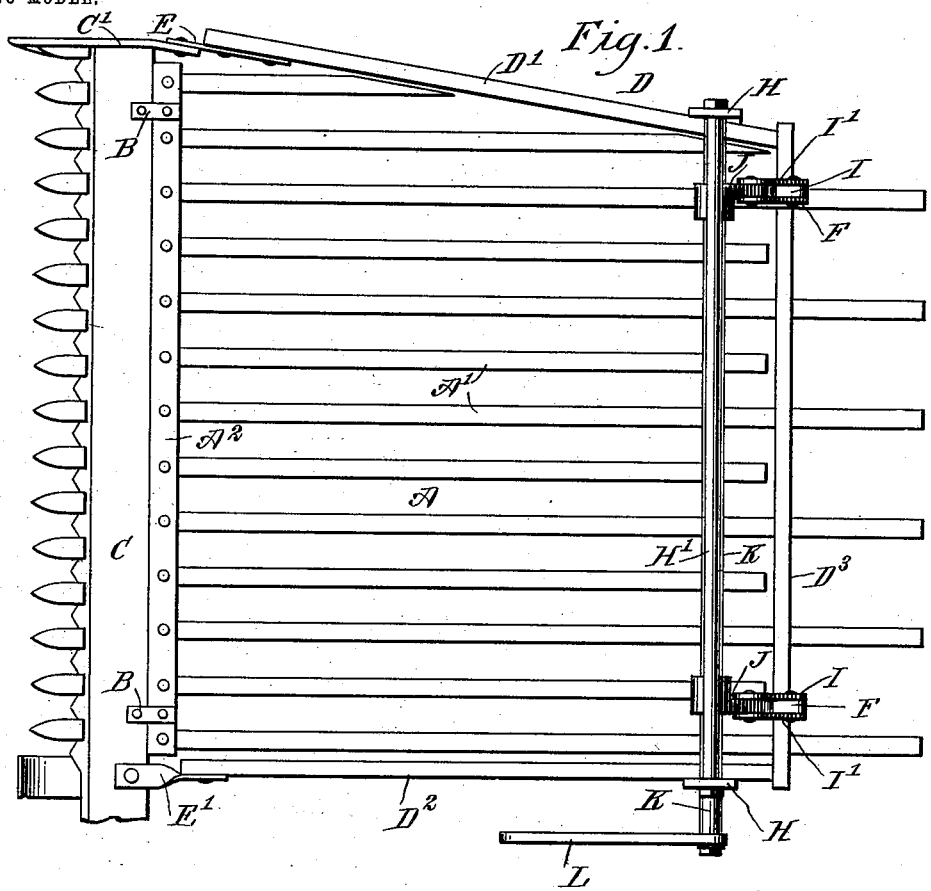
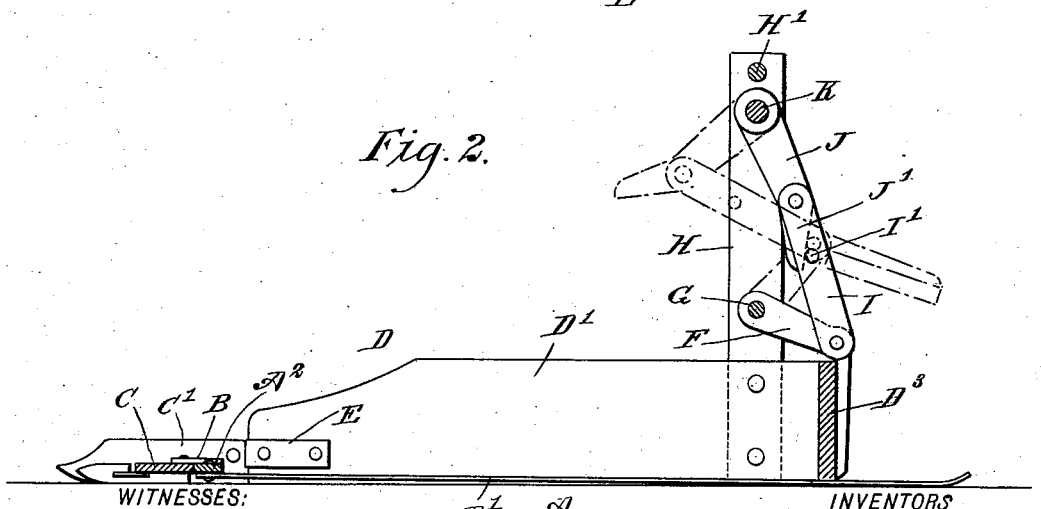
WITNESSES:
Edward Thorpe.
INVENTORS
Henry M. Mueller
Ludwig A. Mueller
John A. Mueller
BY
ATTORNEY No. 756,041.

Patented March 29, 1904.

UNITED STATES PATENT OFFICE.

HENRY MARKUS MUELLER, LUDWIG ANTHY MUELLER, AND JOHN ALYSIUS MUELLER, OF WHITE LAKE, SOUTH DAKOTA.

WINDROWER.

SPECIFICATION forming part of Letters Patent No. 756,041, dated March 29, 1904.

Application filed June 23, 1903. Serial No. 162,750. (No model.)

*To all whom it may concern:*

Be it known that we, HENRY MARKUS MUELLER, LUDWIG ANTHY MUELLER, and JOHN ALYSIUS MUELLER, all citizens of the United States, and residents of White Lake, in the county of Aurora and State of South Dakota, have invented a new and Improved Windrower, of which the following is a full, clear, and exact description.

The invention relates to agricultural machines; and its object is to provide a new and improved windrower or bunching attachment for mowing-machines and which is simple and durable in construction, very effective in operation, and arranged to gather hay, millet, short wheat, and the like as fast as it is mowed by the mowing-machine and to enable the operator to easily and quickly dump the gathered material in windrows without scattering or losing any of the material between adjacent windrows.

The invention consists of novel features and parts and combinations of the same, as will be more fully described hereinafter and then pointed out in the claims.

Reference is to be had to the accompanying drawings, forming a part of this specification, in which similar characters of reference indicate corresponding parts in both the figures.

Figure 1 is a plan view of the improvement as applied, and Fig. 2 is a longitudinal sectional side elevation of the same.

The improved bunching attachment for mowing-machines is provided with a slatted platform A, having longitudinally-extending spaced slats A' of unequal length and fastened at their forward ends to a cross-bar $A^2$, secured by clips B to the finger-bar C of the mowing-machine. Over this platform A is arranged a box-like structure D, having the sides D' $D^2$ and the rear end $D^3$ arranged to form a gate for discharging the material periodically from the attachment, as hereinafter more fully described. The forward end of the side D' is connected by a strap E with the shoe or board C', secured to the outer end of the finger-bar C, and the forward end of the other side $D^2$ is secured by a strap E' to the finger-bar C. The sides D' and $D^2$ are located outside of the outermost slats A' of the platform A, while the end $D^3$ extends somewhat to the rear of sundry of the slats A' and passes over the remaining slats A' a distance from the rear ends, as plainly indicated in Fig. 1. The long slats of the platform prevent the end or gate from coming in contact with the ground in passing over uneven surfaces, and by extending alternate slats only beyond the end or gate a lighter and cheaper platform is produced than if all the slats were of the same length. The end $D^3$ is normally closed, so that when the mowing-machine is moved forward to mow the material the cut material falls onto the platform A and is retained thereon by the box-like structure D, having its rear end $D^3$ in a closed position. Now when sufficient material has accumulated on the attachment the operator opens the end $D^3$, so as to allow the gathered material to pass from the attachment to form a windrow, after which the end $D^3$ is again allowed to close to retain newly-mowed material for forming a second windrow. In order to impart the desired opening movement to the end $D^3$, the following device is provided. From the upper edge of the end $D^3$ extend forwardly and upwardly the hinged members F, fulcrumed on a rod G, extending transversely of the platform and secured in standards H, attached to the sides D' and $D^2$ near the rear ends thereof. The members F are connected by links I with arms J, secured on a shaft K, journaled in the upper portions of the standards H, and on one outer end of the shaft K is secured a handle L within reach of the operator seated on the seat of the mowing-machine. The handle L extends forwardly in an approximately horizontal position at the time the end $D^3$ is in a closed position, and when it is desired to open the end $D^3$ then the operator imparts an upward and rearward swinging motion to the handle L to turn the shaft K, and thereby cause the arms J and links I to impart an upward swinging motion to the end $D^3$, at the same time lifting the end bodily a distance above the sides D', as plainly indicated by dotted lines in Fig. 2, to permit the gathered material to readily pass off the rear end of the platform to form the windrow. As soon as this has been done the operator releases the handle L to allow the end $D^3$ and the parts connected therewith to automatically drop back into their lowermost position by the weight of the parts referred to.

In order to lock the end $D^3$ against accidental opening when in a closed position, the arms J are provided with downward extensions J', adapted to engage pins I', secured on the links I, to swing the latter into an angular position relative to the arms J, as shown in Fig. 2, to prevent the end $D^3$ from swinging accidentally into an open position.

By having the box-like structure D arranged over the slatted platform A the material is not liable to be scattered while the attachment moves with the mowing-machine from one windrow to the other, and as the end $D^3$ is securely locked in place while gathering the material it is evident that none of the material will be lost at the end of the attachment while the latter passes from one windrow to the other.

The upper ends of the standards H are connected with each other by a cross-bar H' to strengthen the box-like structure.

Having thus described our invention, we claim as new and desire to secure by Letters Patent—

1. A bunching attachment for mowing-machines, comprising a slatted platform having longitudinal slats of unequal length and adapted to be fastened to the mowing-machine, and a box-like structure arranged over the platform and having sides and a rear end, the said rear end being at the rear of the shorter slats of the platform and extending over the longer slats and forming a gate for discharging the bunched material accumulating on the platform within the box-like structure, as set forth.

2. A bunching attachment for mowing-machines, comprising a slatted platform having longitudinal slats of unequal length and adapted to be fastened to the mowing-machine, a box-like structure arranged over the platform and having sides and a rear end, the box-like structure being secured to the mowing-machine independently of the platform, and the said rear end being at the rear of the shorter slats of the platform and extending over the longer slats and forming a gate for discharging the bunched material accumulating on the platform within the box-like structure, and means under the control of the operator of the mowing-machine for swinging the gate rearward and upward above the sides of the box-like structure, as set forth.

3. A bunching attachment for mowing-machines, comprising a slatted platform adapted to be fastened to the mowing-machine, a box-like structure arranged over the platform and having sides and a rear end, the box-like structure being secured to the mowing-machine independently of the platform, and the said rear end forming a gate for discharging the bunched material accumulating on the platform within the box-like structure, and means under the control of the operator of the mowing-machine for swinging the gate rearward and upward above the sides of the box-like structure, the said means comprising links connected with hinged members on the said end, arms pivotally connected with the said links, and a shaft having a handle and carrying the said arms, as set forth.

4. A bunching attachment for mowing-machines, comprising a slatted platform adapted to be fastened to the mowing-machine, a box-like structure arranged over the platform and having sides and a rear end, the box-like structure being secured to the mowing-machine independently of the platform, and the said rear end forming a gate for discharging the bunched material accumulating on the platform within the box-like structure, means under the control of the operator of the mowing-machine for swinging the gate rearward and upward above the sides of the box-like structure, the said means comprising links connected with hinged members on the said end, arms pivotally connected with the said links, and a shaft having a handle and carrying the said arms, and a locking device for the said means comprising extensions on the said arms, and pins engaged by the extensions and secured on the said links.

5. A bunching attachment for mowing-machines, comprising a slatted platform, a box-like structure arranged over the platform and comprising sides and an outwardly-swinging and bodily-movable end, and means for operating said end, as set forth.

6. A bunching attachment for mowing-machines, comprising a slatted platform, a box-like structure arranged over the platform and comprising sides and a rear end having forwardly and upwardly inclined pivoted members, an operating-lever, and a connection between the lever and the pivoted members of the said end, as set forth.

7. A bunching attachment for mowing-machines, provided with a gate having hinged members, links pivotally connected with the said hinged members, a shaft having arms pivotally connected with the said links, a handle on the said shaft and under the control of the operator for turning the said shaft, extensions on the said arms, and pins on the said links and adapted to be engaged by the said extensions, as set forth.

In testimony whereof we have signed our names to this specification in the presence of two subscribing witnesses.

HENRY MARKUS MUELLER.
LUDWIG ANTHY MUELLER.
JOHN ALYSIUS MUELLER.

Witnesses:
JAKE KRELL,
MALCOLM MCMILLAN.